Patented Feb. 21, 1928.

1,660,097

UNITED STATES PATENT OFFICE.

MAX SCHMID, OF RIEHEN, NEAR BASEL, SWITZERLAND, ASSIGNOR TO THE FIRM: SOCIETY OF CHEMICAL INDUSTRY IN BASLE, OF BASEL, SWITZERLAND.

AZO DYESTUFF THE 1-(2'-CHLORO)-PHENYL-3-METHYL-5-PYRAZOLONE-AZO-BENZENE.

No Drawing. Application filed July 19, 1926, Serial No. 123,598, and in Switzerland August 1, 1925.

The present invention relates to a new azo dyestuff valuable for the production of fast tints on acetyl cellulose. It comprises the new product and the material dyed with the new dyestuff. The new dyestuff is obtained by coupling diazo-benzene with 1-(2'-chloro)-phenyl-3-methyl-5-pyrazolone and corresponds with the formula:

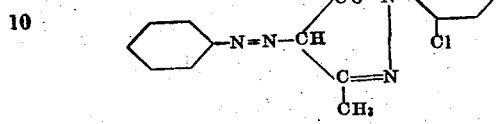

It forms a yellow powder, insoluble in water, soluble in benzene and other organic solvents with yellow coloration yielding on acetyl cellulose, when dyed from an aqueous suspension, beautiful pure yellow tints with excellent properties of fastness.

Example.

11 parts of 1-(2'-chloro)-phenyl-3-methyl-5-pyrazolone are dissolved in dilute soda solution and treated with a diazo solution obtained from 4, 6 parts of aniline. The dyestuff that separates in yellow flakes is filtered, washed and dried. It forms a yellow powder soluble in benzene with yellow coloration and dyes acetate cellulose pure greenish-yellow shades with excellent properties of fastness.

What I claim is:

As a new product the herein described azo dyestuff of the formula:

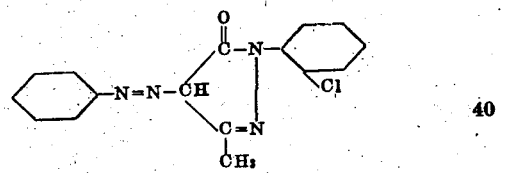

which product forms a yellow powder insoluble in water, soluble in benzene or other organic solvents with yellow coloration, yielding on acetate cellulose, when dyed from an aqueous suspension, beautiful pure greenish-yellow shades with excellent properties of fastness.

In witness whereof I have hereunto signed my name this 8th day of July, 1926.

MAX SCHMID.